United States Patent
Kwan et al.

(10) Patent No.: US 8,762,712 B1
(45) Date of Patent: Jun. 24, 2014

(54) METHODS AND SYSTEM FOR PERSON-TO-PERSON SECURE FILE TRANSFER

(75) Inventors: Philip Kwan, San Jose, CA (US); Michael Harry Palmer, Taipei (TW)

(73) Assignee: Trend Micro Incorporated, Tokyo (JP)

( * ) Notice: Subject to any disclaimer, the term of this patent is extended or adjusted under 35 U.S.C. 154(b) by 6 days.

(21) Appl. No.: 13/559,968

(22) Filed: Jul. 27, 2012

(51) Int. Cl.
  *H04L 9/00* (2006.01)
(52) U.S. Cl.
  USPC .............................. 713/165; 713/171; 380/30
(58) Field of Classification Search
  USPC ............ 713/165, 168, 171; 380/30, 277–278, 380/282
  See application file for complete search history.

(56) References Cited

U.S. PATENT DOCUMENTS

| | | | | |
|---|---|---|---|---|
| 6,009,173 | A * | 12/1999 | Sumner | 713/156 |
| 6,625,734 | B1 | 9/2003 | Marvit et al. | |
| 6,904,521 | B1 | 6/2005 | Jivsov | |
| 8,321,669 | B2 * | 11/2012 | Dancer | 713/168 |
| 2004/0236953 | A1 | 11/2004 | Merenne et al. | |
| 2005/0138353 | A1 | 6/2005 | Spies et al. | |
| 2007/0183600 | A1 | 8/2007 | Smart | |
| 2010/0046757 | A1 * | 2/2010 | Dancer et al. | 380/277 |
| 2011/0167258 | A1 * | 7/2011 | Schibuk | 713/156 |
| 2011/0289310 | A1 * | 11/2011 | Selgas et al. | 713/150 |
| 2012/0131341 | A1 * | 5/2012 | Mane et al. | 713/168 |
| 2012/0179909 | A1 * | 7/2012 | Sagi et al. | 713/167 |
| 2012/0297183 | A1 * | 11/2012 | Mukkara et al. | 713/153 |

FOREIGN PATENT DOCUMENTS

| | | |
|---|---|---|
| EP | 1 646 194 | 4/2006 |
| FR | 2 839 406 | 11/2003 |
| JP | 11-340965 | 12/1999 |
| WO | 2007/113547 | 10/2007 |

OTHER PUBLICATIONS

DropSend—Email large files and send large files, 1 sheet [retrieved on Jul. 20, 2012], retrieved from the internet: http://www.dropsend.com/.
Online File Sharing, Send large files, Managed File Transfer, FTP Replacement, . . . 1 sheet [retrieved on Jul. 20, 2012], retrieved from the internet: http://www.yousendit.com/.
Send Big Files Free—Email or Send Large Files—SendThisFile, 2 sheets [retrieved on Jul. 20, 2012], retrieved from the internet: http://www.sendthisfile.com/.
Watchdox Is the Preferred Enterprise Document Centric Security Solution, 2 sheets [retrieved on Jul. 20, 2012], retrieved from the internet: http://www2.watchdox.com/.

(Continued)

*Primary Examiner* — Samson Lemma
(74) *Attorney, Agent, or Firm* — Okamoto & Benedicto LLP

(57) ABSTRACT

A person-to-person secure file transfer system includes an originating computer that receives a public key of a recipient from a cloud computing system. The originating computer encrypts a file using a message key, and encrypts the message key using the public key of the recipient. The encrypted file is stored in the cloud computing system. In response to a request from a receiving computer, the cloud computing system decrypts the encrypted message key using a private key of the recipient, decrypts the encrypted file using the message key, and provides the now decrypted file to the receiving computer. In another example, the cloud computing system provides the private key of the recipient and the encrypted file to the receiving computer, which decrypts the encrypted message key using the private key of the recipient and decrypts the encrypted file using the message key.

25 Claims, 13 Drawing Sheets

(56) References Cited

OTHER PUBLICATIONS

ShareVault / Secure Document Sharing & Virtual Deal Room, 2 sheets [retrieved on Jul. 20, 2012], retrieved from the internet: http://www.sharevault.com/.

Citrix Systems >> ShareFile, 3 sheets [retrieved on Jul. 20, 2012], retrieved from the internet: http://www.citrix.com/English/ps2/products/product.asp?contentID=2320956.

Hushmail—Free Email with Privacy, 1 sheet [retrieved on Mar. 27, 2012], retrieved from the internet http://www.hushmail.com.

AES text encryptor—encipher.it AES Text encryptor for Google Mail or anything else, 3 sheets [retrieved on Mar. 27, 2012], retrieved from the internet https://encipher.it/.

FireGPG—Welcome to the official websit of FireGPG!, 4 sheets [retrieved on Mar. 27, 2012], retrieved from the internet http://getfiregpg.org/s/home.

GNU Privacy Guard—From Wikipedia, the free encyclopedia, 4 sheets [retrieved on Mar. 27, 2012], retrieved from the internet http://en.wikipedia.org/wiki/GNU_Privacy_Guard.

Noel McCullagh "Securing E-Mail with Identity-Based Encryption", May-Jun. 2005, 4 sheets, IT Professional, IEEE vol. 7, Issue 3.

\* cited by examiner

553

554

METHODS AND SYSTEM FOR PERSON-TO-PERSON SECURE FILE TRANSFER

BACKGROUND OF THE INVENTION

1. Field of the Invention

The present invention relates generally to computer security, and more particularly but not exclusively to methods and apparatus for secure file transfers between user computers.

2. Description of the Background Art

Person-to-person file transfer involves transfer of a computer file from one user computer to another user computer. Unlike other ways of transferring files, such as between a user computer and a server or vice versa, person-to-person file transfer involves a typical user sending a file to a friend, a customer, a relative or some other person who may or may not be computer savvy. File transfer between user computers thus needs to be as user friendly as possible, especially when transferring files containing confidential information. These days, it is not uncommon for users to send files containing tax returns, loan application, and the like. If the process of securely transferring a confidential file is overly complicated, users may not bother with following the process and simply send the confidential file in the clear as an email attachment.

There are several methods of performing person-to-person secure file transfer. For example, secure file transfer may be performed using a "pretty good privacy" (PGP) like account, with the need to exchange keys with recipients to allow encryption and digital signing of exchanged files. Another example method involves using some form of cloud service that provides a form based process to allow a user to send files to another user via email. The cloud service may use some form of encryption during transit (e.g., secure socket layer (SSL) protocol) and encrypt the files at rest on their cloud servers. These and other methods do not adequately secure the file, especially from being opened by a person other than the intended recipient, are overly complicated for users that are not interested in learning much computer technology, and/or require users to exchange and manage keys.

SUMMARY

In one embodiment, a person-to-person secure file transfer system includes an originating computer that receives a public key of a recipient from a cloud computing system. The originating computer encrypts a file using a message key, and encrypts the message key using the public key of the recipient. The encrypted file is stored in the cloud computing system. In response to a request from a receiving computer, the cloud computing system decrypts the encrypted message key using a private key of the recipient, decrypts the encrypted file using the message key, and provides the now decrypted file to the receiving computer. In another example, the cloud computing system provides the private key of the recipient and the encrypted file to the receiving computer, which decrypts the encrypted message key using the private key of the recipient and decrypts the encrypted file using the message key.

These and other features of the present invention will be readily apparent to persons of ordinary skill in the art upon reading the entirety of this disclosure, which includes the accompanying drawings and claims.

The use of the same reference label in different drawings indicates the same or like components.

DETAILED DESCRIPTION

In the present disclosure, numerous specific details are provided, such as examples of apparatus, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
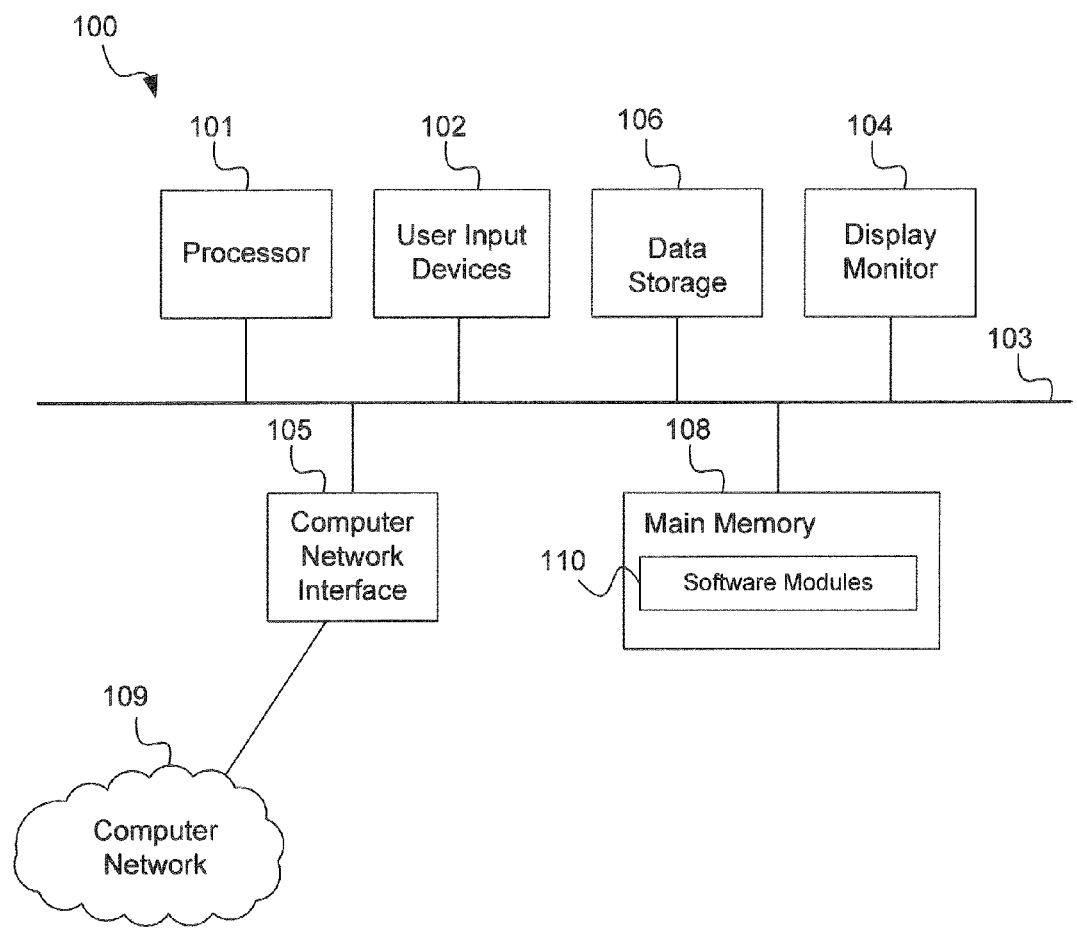
FIG. 1 shows a schematic diagram of a computer that may be employed with embodiments of the present invention.

Referring now to FIG. 1, there is shown a schematic diagram of a computer 100 that may be employed with embodiments of the present invention. The computer 100 may be employed as a user computer (e.g., originating computer or receiving computer) or as a computer of a cloud computing system, for example. The computer 100 may have fewer or more components to meet the needs of a particular application. The computer 100 may include one or more processors 101. The computer 100 may have one or more buses 103 coupling its various components. The computer 100 may include one or more user input devices 102 (e.g., keyboard, mouse), one or more data storage devices 106 (e.g., hard drive, optical disk, Universal Serial Bus memory), a display monitor 104 (e.g., liquid crystal display, flat panel monitor, cathode ray tube), a computer network interface 105 (e.g., network adapter, modem), and a main memory 108 (e.g., random access memory). The computer network interface 105 may be coupled to a computer network 109, which in this example includes the Internet.

The computer 100 is a particular machine as programmed with software modules 110. The software modules 110 comprise computer-readable program code stored non-transitory in the main memory 108 for execution by the processor 101. As an example, the software modules 110 may comprise a web browser, a secure file transfer application, or both when the computer 100 is employed as a user computer. As another example, the software modules 110 may comprise a key server, a post office server, and a database when the computer 100 is employed as part of a cloud computing system.

The computer 100 may be configured to perform its functions by executing the software modules 110. The software modules 110 may be loaded from the data storage device 106 to the main memory 108. The software modules 110 may also be made available on other computer-readable storage medium including optical disk, flash drive, and other memory devices.

Figure 2:
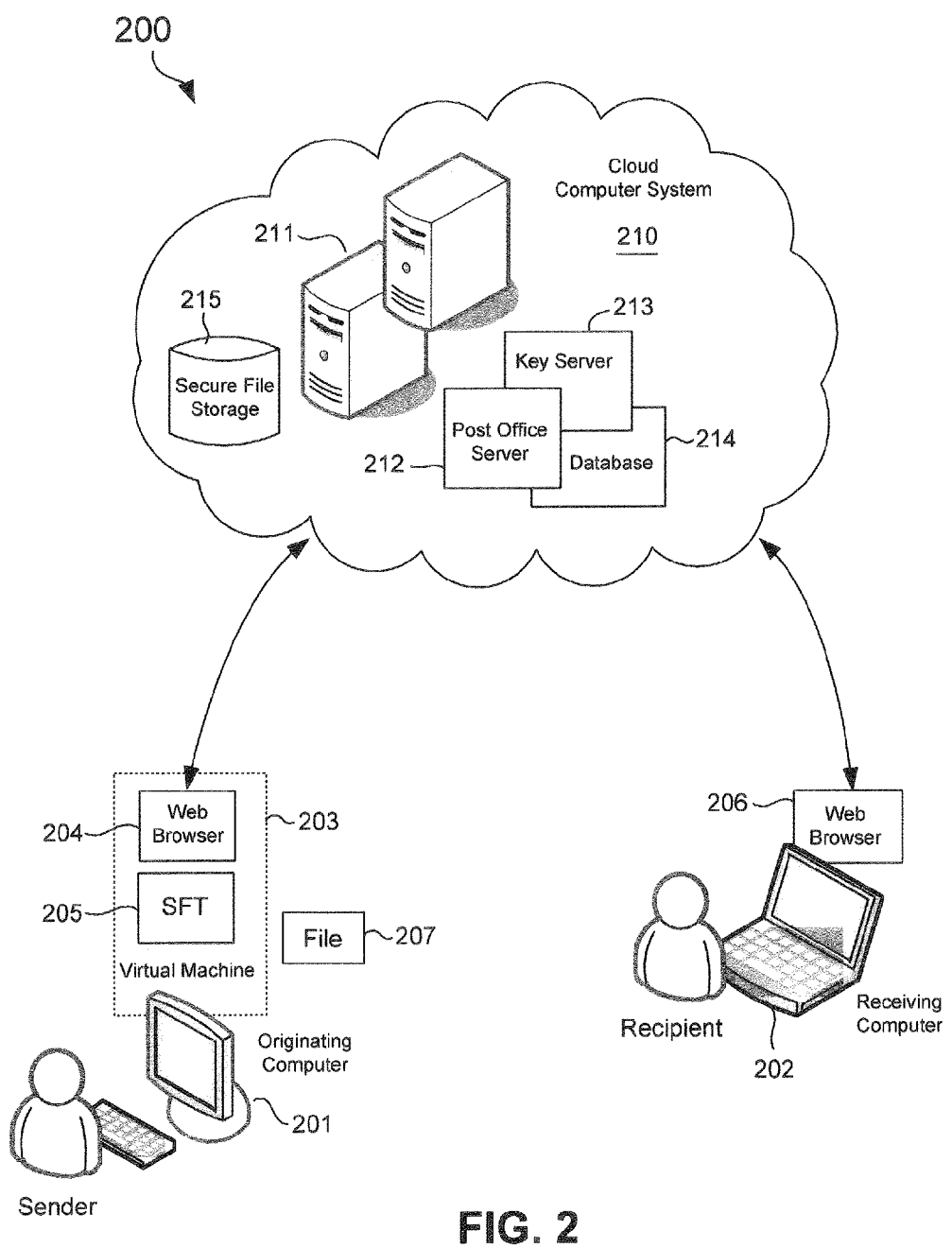
FIG. 2 shows a schematic diagram of a person-to-person secure file transfer system in accordance with an embodiment of the present invention.

FIG. 2 shows a schematic diagram of a person-to-person secure file transfer system 200 in accordance with an embodiment of the present invention. In the example of FIG. 2, the secure file transfer system 200 includes a cloud computing system 210 and user computers in the form of an originating computer 201 and a receiving computer 202. The computers 201 and 202 may comprise computers employed by users to send and receive files, including laptops, desktops, tablets, smartphones, and other computing devices.

As will be more apparent below, the system 200 allows for symmetric encryption of a file using a message key, which is the same message key that is used to decrypt the encrypted file. The message key itself may be encrypted by asymmetric identify-based encryption (IBE) that is based on the identity of the recipient, such as the recipient's e-mail address or username. For example, the message key may be encrypted using a public key of a recipient, and the encrypted message key may be decrypted by a corresponding private key of the recipient. The public key of the recipient may be based on the recipient's e-mail address as per PGP encryption. The public key-private key pair for encrypting-decrypting the message key may be generated by, stored in, and managed by the cloud computing system 210 to make the secure file transfer process relatively easy for the users.

In one embodiment, the originating computer 201 encrypts the file 207 with a randomly generated message key, gets a recipient e-mail address, receives a public key of the recipient from the cloud computing system 210, encrypts the message key using the public key of the recipient, sends the encrypted file 207 and the encrypted message key to the cloud computing system 210, receives a uniform resource identifier (URI) of the encrypted file 207 as stored in the cloud computing system 210, and sends an e-mail notification containing the URI of the encrypted file 207 to the receiving computer 202 of the recipient. In other embodiments, the originating computer 201 provides the e-mail address of the recipient to the cloud computing system 210, which then provides the receiving computer 202 a notification in the form of an e-mail containing the URI of the encrypted file 207. The receiving computer 202 may receive a notification containing the URI of the encrypted file 207, and follow the URI of the encrypted file 207 (e.g., by activating a link to the URI) to receive a decrypted file 207 from the cloud computing system 210.

In the example of FIG. 2, the computers 201 and 202 employ web browsers and/or web protocols to send and receive files. In particular, the originating computer 201 may include a web browser 204 to securely send a file 207, and the receiving computer 202 may include a web browser 206 to receive the file 207. As will be more apparent below, the computers 201 and 202 may securely send and receive files by way of the cloud computing system 210.

The web browsers 204 and 206 may employ conventional web browsing technology. For example, the web browsers 204 and 206 may employ the hypertext transfer protocol (HTTP), and preferably HTTP secure (HTTPS), to communicate with the cloud computing system 210 over the Internet. In one embodiment, for improved security, the web browser 204 comprises a web browser that runs in a virtual machine 203 hosted by the originating computer 201. The virtual machine 203 has an operating system separate from the host operating system of the user computer 201. Running the web browser 204 in the virtual machine 203 prevents tampering and allows for a clean start each time the web browser 204 is started. A secure file transfer (SFT) application 205 may be running in the virtual machine 203 and provided as an added feature of the web browser 204. For example, the web browser 204 may include an option (e.g., a button or a menu item) to allow a sender, i.e., a user that sends a file, to securely send a file. The web browser 204 may also be a conventional web browser, such as the WINDOWS INTERNET EXPLORER web browser. In that embodiment, the SFT application 205 may be implemented as a browser plug-in, including as Browser Helper Objects (e.g., DLL plugins for MICROSOFT INTERNET EXPLORER web browser) and browser add-ons/extensions (e.g., JavaScript plugins for FIREFOX web browser or GOOGLE CHROME web browser). The SFT application 205 may also be a standalone application that employs a web protocol to communicate with the cloud computing system 210.

The web browser 206 of the receiving computer 202 may be a conventional web browser. This advantageously allows a recipient, i.e., a user that receives a file, to receive a file without needing an SFT application. However, for added functionality and even more user-friendly file reception, the web browser 206 may also have access to a compatible SFT application. This feature is later described with reference to FIGS. 15-20.

The SFT application 205 may comprise computer-readable program code for securely sending files to other user computers by way of the cloud computer system 210. The SFT application 205 may be invoked from the web browser 204 and communicate over the Internet by way of the web browser 204. In one embodiment, the SFT application 205 provides one or more user interfaces to allow the sender to send a file 207 to a recipient, encrypts the file 207 with a random message key (e.g., using advanced encryption standard (AES)), gets an e-mail address of the recipient, retrieves a public key of the recipient from a key server 213, encrypts the message key using the public key of the recipient, sends the encrypted file 207 and the encrypted message key to a post office server 212, receives a uniform resource identifier (URI) or other identifier of the encrypted file 207 as stored in the secure file storage 215, and sends an e-mail containing the URI of the encrypted file 207 to the receiving computer 202 of the recipient. In other embodiments, the SFT application sends the e-mail address of the recipient to the post office server 212, which then sends a notification containing the URI or other identifier of the encrypted file 207 to the receiving computer 202.

The cloud computer system 210 may comprise one or more computers (e.g., a network of computers) for facilitating a person-to-person secure file transfer. The cloud computer system 210 is in-the-cloud it that it is remotely located from the computers 201 and 202 and accessible over the Internet or other computer network. In one embodiment, the cloud computer system 210 generates a private key-public key pair of a recipient, provides the public key of the recipient to a requesting originating computer 201, receives an encrypted file 207 and an encrypted message key for decrypting the encrypted file 207 from the originating computer 201, stores the encrypted file 207 and the encrypted message key, and provides the URI (or other identifier) of the encrypted file 207 to the originating computer 201. In other embodiments, the cloud computing system 210 provides the receiving computer 202 a notification that contains the URI of the encrypted file 207. In response to receiving the URI from the receiving computer 202, the cloud computer system 210 may decrypt the encrypted message key using the private key of the recipient, decrypt the encrypted file 207 using the decrypted message key, and provide the encrypted file 207 to the receiving computer 202.

The cloud computer system 210 may comprise one or more server computers 211 hosting a post office server 212, a key server 213, and a database 214. The cloud computer system 210 may further include a secure file storage 215 for securely storing files being transferred between users, such as from an originating computer 201 to a receiving computer 202. For example, the file 207 may be encrypted in the originating computer 201 and stored in the secure file storage 215 in the encrypted state in transit to the receiving computer 202.

The post office server 212 may comprise computer-readable program code for serving requests to store and forward files that are being transferred in a person-to-person secure file transfer. The post office server 212 may receive an encrypted file 207 from the SFT application 205, store the encrypted file 207 in the secure file storage 215, and provide the SFT application 205 the URI of the encrypted file 207 as stored in the secure file storage 215. The post office server 212 may also receive the e-mail address of the recipient from the SFT application 205, and then send a notification in the form of an e-mail containing the URI of the encrypted file 207 to the receiving computer 202.

In response to receiving the URI from the receiving computer 202, the post office server 212 may receive the private key of the recipient from the key server 213, decrypt the encrypted message key using the private key of the recipient, use the decrypted message key to decrypt the encrypted file 207, provide the decrypted file 207 to the receiving computer 202, and delete the encrypted file 207 from the secure file storage 215. The post office server 212 may allow users to register to use its service, and store user registration information and profiles in a database 214.

The key server 213 may comprise computer-readable program code for generating and managing encryption keys for identity based encryption (IBE). In one embodiment, the key server 213 generates a public key-private key pair of a recipient using PGP encryption and based on an e-mail address of the recipient. The public key and private key of the recipient may be stored and managed in the cloud computing system 210 for the convenience of the users. The key server 213 may provide the public key of the recipient to a requesting SFT application 205, and the private key of the recipient to a requesting post office server 212. The key server 213 may receive the e-mail address of a recipient from the SFT application 205 directly or by way of the post office server 212.

Figure 3:
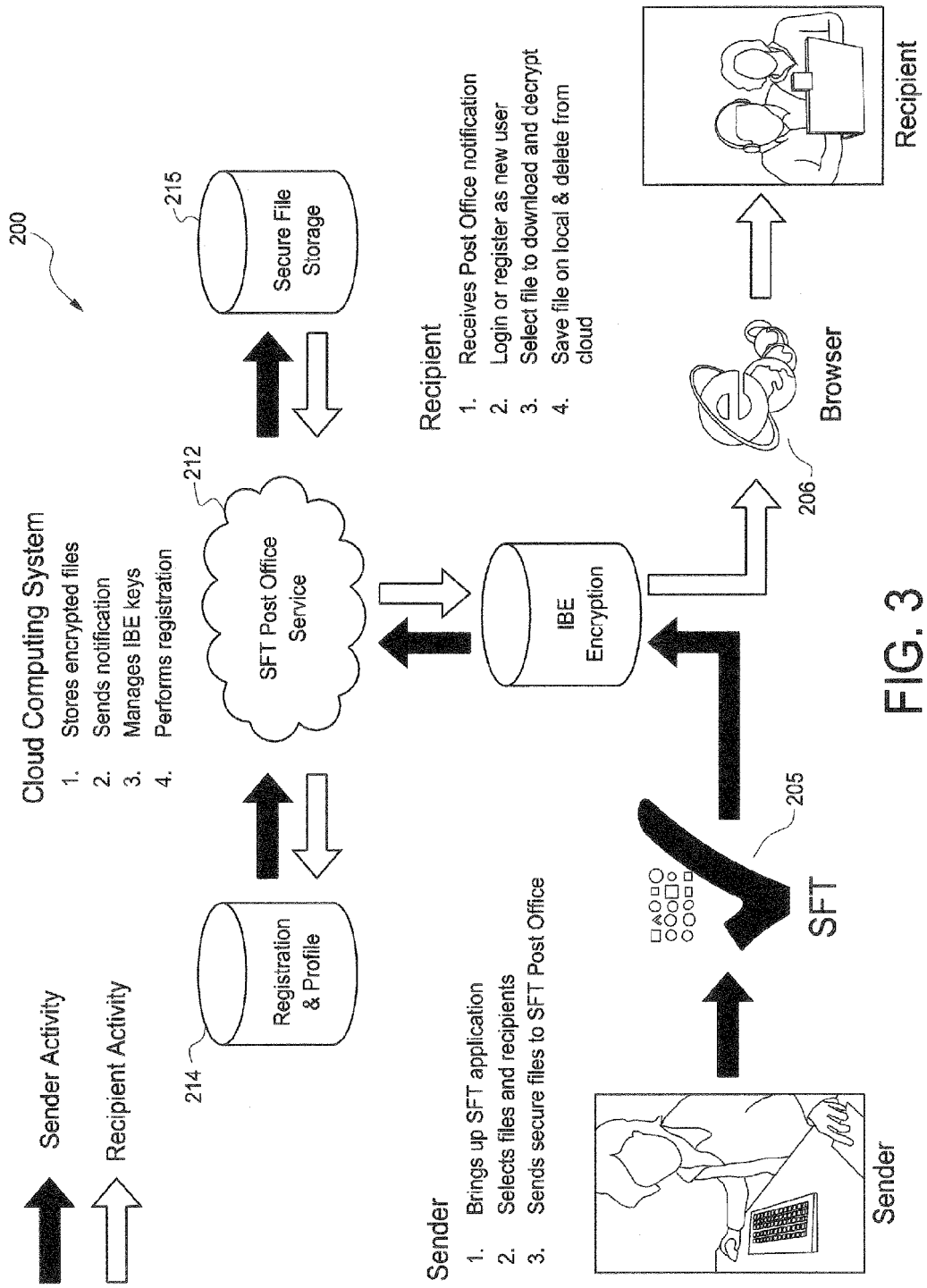
FIG. 3 schematically illustrates operation of the person-to-person secure file transfer system of FIG. 2 in accordance with an embodiment of the present invention.

FIG. 3 schematically illustrates operation of the person-to-person secure file transfer system 200 in accordance with an embodiment of the present invention. In the example of FIG. 3, the IBE encryption may be performed by the SFT application 205 in the originating computer 201 (see FIG. 2) employed by the sender to send encrypted files to the SFT post office server 212, and by the post office server 212 to decrypt encrypted files before forwarding them to the receiving computer 202 of the recipient. The database 214 may contain user registration and profiles. Encrypted files and encrypted message keys may be stored in the secure file storage 215.

In the example of FIG. 3, the sender brings up the SFT application 205. The sender then uses user interfaces of the SFT application 205 to select one or more files to be transferred, to select one or more recipients of the files, and to send the files to the SFT post office service, which in this example is the post office server 212 hosted by the cloud computing system 210 (see FIG. 2). The sender may invoke the SFT application 205 from a web browser, as a stand-alone application, or as part of a suite of computer security applications, for example. The SFT application 205 automatically performs IBE encryption on the files. As can be appreciated, the user experience of the sender in the example of FIG. 3 is similar to sending an e-mail with attachments. Advantageously, the relative ease of sending files to recipients encourages use of secure file transfer.

Continuing the example of FIG. 3, the cloud computing system 210 hosting the post office server 212 receives encrypted files and encrypted message keys from senders and stores them in secure file storage 215. The cloud computing system 210 manages the IBE encryption keys for the users and performs user registration. In the example of FIG. 3, the cloud computing system 210 sends notifications to recipients, alerting them of availability of files to be transferred to them.

The recipient receives the notification from the post office server 212. The recipient uses the web browser 206 to log in or register as a new user with the post office server 212 to receive one or more files being transferred to the recipient. Using a webpage displayed on the web browser 206, the recipient selects a file to be decrypted and thereafter downloaded to his computer. The recipient receives the decrypted file from the post office server 212, and locally saves the decrypted file. The recipient then selects to delete the corresponding encrypted file in the cloud computing system 210.

Figure 4:
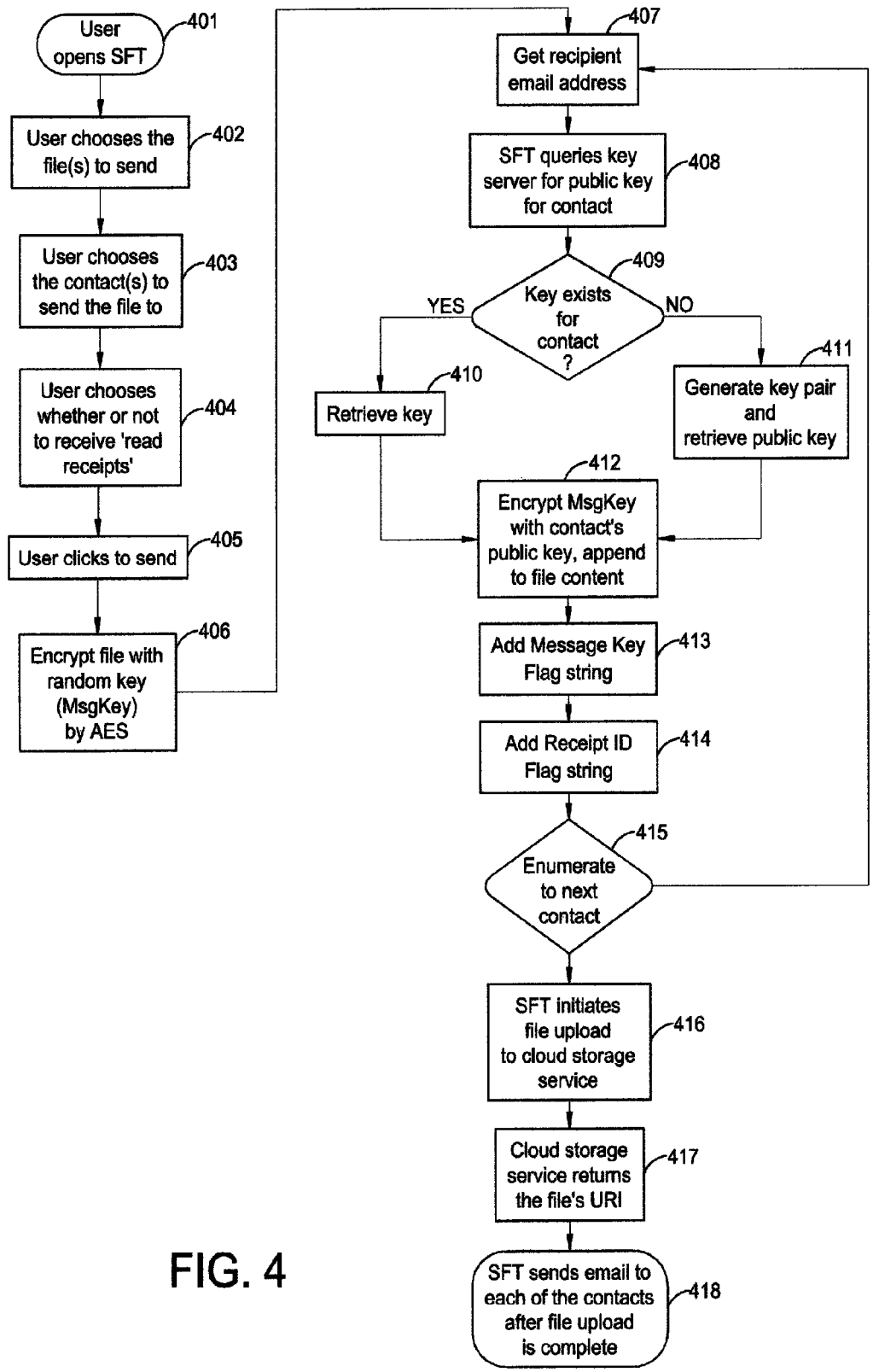
FIG. 4 shows a flow diagram of a method of sending a file by person-to-person secure file transfer in accordance with an embodiment of the present invention.

FIG. 4 shows a flow diagram of a method of sending a file by person-to-person secure file transfer in accordance with an embodiment of the present invention. The method of FIG. 4 is explained using the components of the system 200 (see FIG. 2) for illustration purposes. In particular, the steps 401-408, 412-416, and 418 may be performed by or using an originating computer 201, and the steps 409-411 and 417 may be performed by the cloud computing system 210.

In the example of FIG. 4, the user, who is the sender in the method of FIG. 4, invokes the SFT application 205 (step 401). The SFT application 205 provides a user interface to allow the user to choose one or more files to send (step 402). The SFT application 205 provides a user interface to enable the user to go through his contact list to select one or more recipients for a selected file (step 403). Optionally, the SFT application 205 allows the user to choose whether or not to receive read receipts, i.e., a return notification that a recipient has received a file. The user clicks a send button of the SFT application 205 to initiate file transfer to recipients (step 405). In response, the SFT application 205 encrypts each file to be sent using a randomly generated symmetric message key by AES, for example (step 406).

The SFT application 205 gets the e-mail address of a recipient, e.g., from the contact list (step 407). The SFT application 205 provides the e-mail address of the recipient to the key server 213 and requests the key server 213 for the public key of the recipient. If a public key already exists for the recipient, the key server 213 simply retrieves the public key and sends the public key to the SFT application 205 (step 409 to step 410). Otherwise, the key server 213 generates a public key-private key pair for the recipient using the recipient's e-mail address, and then provides the public key to the SFT application 205 (step 409 to step 411). The SFT application 205 encrypts a message key of an encrypted file using the public key of the recipient (step 412). The SFT application 205 adds the encrypted message key (step 413) and a recipient identifier, which is the e-mail address of the recipient in this example, as flag strings that are included with a corresponding encrypted file (step 414). Steps 407 to step 415 are repeated for each recipient.

After message keys have been encrypted for each recipient, the SFT application 205 initiates upload of the encrypted files, and corresponding recipient e-mail addresses and encrypted message keys, to the cloud computer system 210, where the encrypted files, encrypted message keys, and recipient e-mail addresses are stored in the secure file storage 215 (step 416). In response, the post office server 212 provides the URI of each encrypted file to the SFT application 205 (step 417). After the file upload has completed, the SFT application 205 sends an e-mail notification containing the URI to each recipient (step 418). The notification may also be sent by the post office server 212.

FIGS. 5-9 schematically show user interfaces for sending a file by person-to-person secure file transfer in accordance with an embodiment of the present invention. The user interfaces may be displayed on the display monitor of the originating computer 201.

Figure 5:
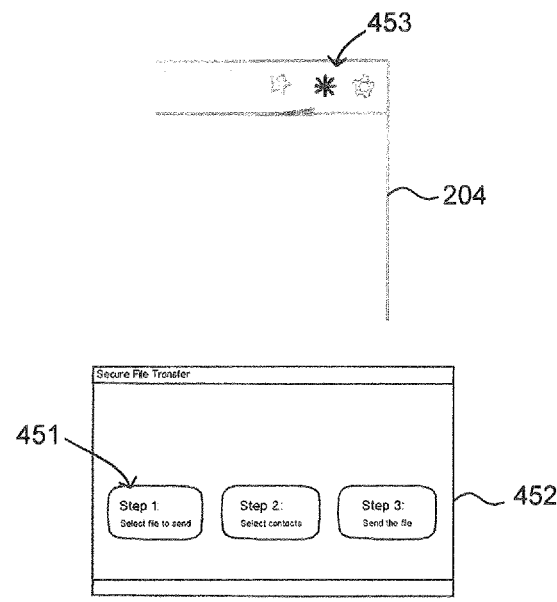
FIGS. 5-9 schematically show user interfaces for sending a file by person-to-person secure file transfer in accordance with an embodiment of the present invention.

In FIG. 5, the user, who is the sender in this example, clicks on an icon (see arrow 453) on the web browser 204 to start the SFT application 205. In response to activation of the icon, the SFT application 205 displays a user interface 452 that outlines the steps for securely sending a file. In the example of FIG. 5, the user interface 452 has three buttons for initiating each of the sequential steps of sending a file. The user interface 452 remains displayed until the file to be transferred is uploaded to the cloud computer system 210. The user clicks on "Step 1" to select a file to send (see arrow 451).

Figure 6:
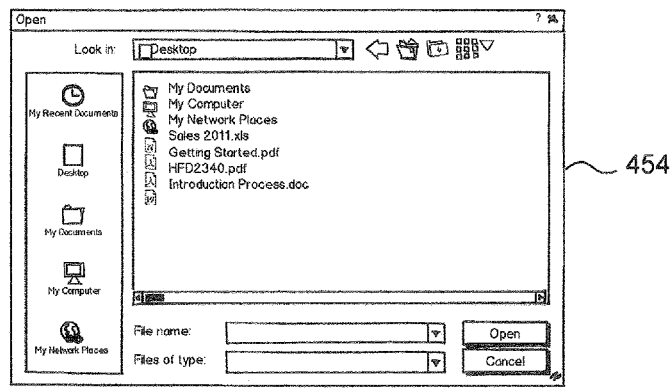
Figure 6:
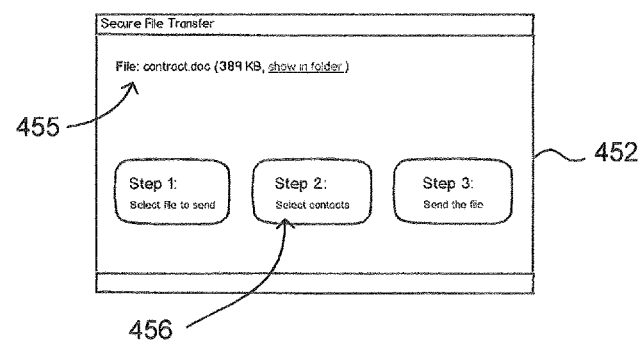

In FIG. 6, in response to activation of "Step 1", the SFT application 205 displays the user interface 454 to allow the user to select one or more files to send. The user selects a file, which is "contract.doc" in the example. The selected file is reflected in the user interface 452 (see arrow 455). The user clicks on "Step 2" to select one or more contacts, i.e., recipients, to receive the selected file (see arrow 456).

Figure 7:
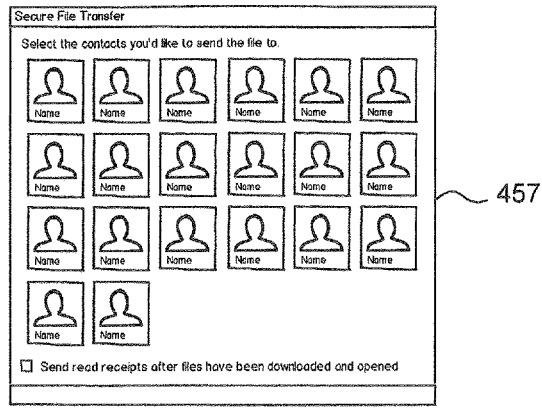
Figure 7:
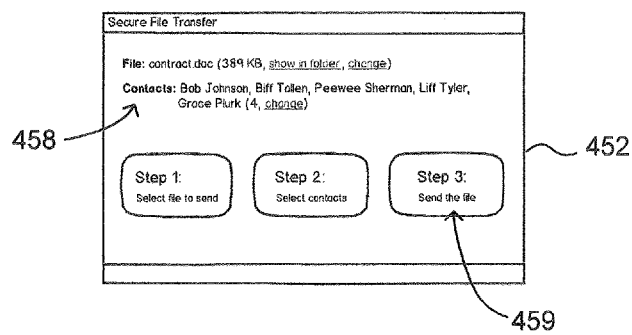

In FIG. 7, in response to activation of "Step 2", the SFT application 205 displays the user interface 457 to allow the user to select one or more recipients from a contact list. The user selects several recipients, who are reflected in the user interface 452 (see arrow 458). The user clicks on "Step 3" to send the files to the recipients (see arrow 459).

Figure 8:
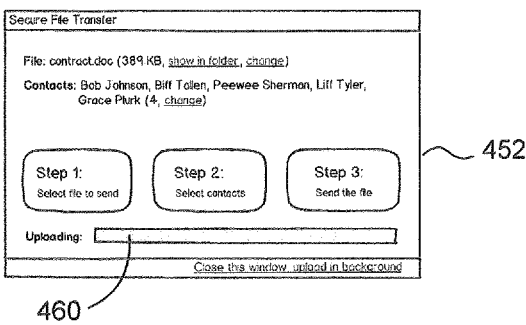

In FIG. 8, in response to activation of "Step 3", the SFT application 205 updates the user interface 452 with an upload progress bar 460 to indicate to the user the status of the file upload to the cloud computer system 210. In the background, the SFT application 205 automatically performs encryption of the file in a manner previously discussed. Advantageously, the file encryption is automatically performed without the user having to manage encryption keys. As can be appreciated, the described person-to-person secure file transfer process is as simple as sending an e-mail, thus encouraging users to transfer files securely.

Figure 9:
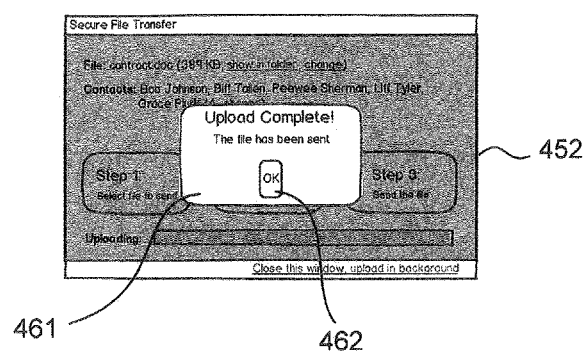

In FIG. 9, the SFT application 205 displays a completion message 461 after the file has been uploaded to the cloud computing system 210. The SFT application 205 may remove the message 461 and the user interface 452 when the user clicks on the OK button 462 of the message 461.

Figure 10:
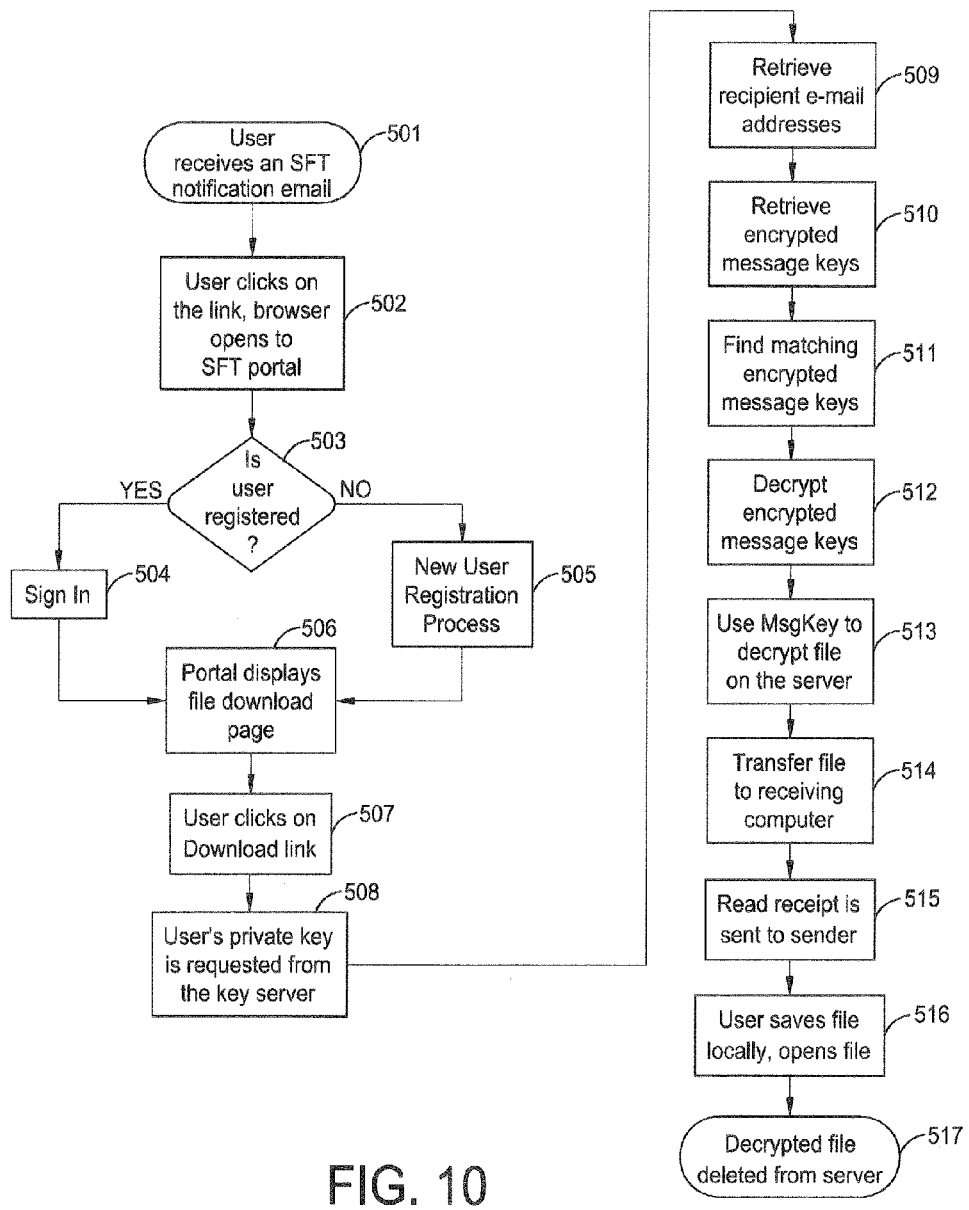
FIG. 10 shows a flow diagram of a method of receiving a file by person-to-person secure file transfer in accordance with an embodiment of the present invention.

FIG. 10 shows a flow diagram of a method of receiving a file by person-to-person secure file transfer in accordance with an embodiment of the present invention. The method of FIG. 10 is explained using the components of the system 200 (see FIG. 2) for illustration purposes. In particular, the steps 501, 502, 507, and 516 may be performed by or using a receiving computer 202, and the steps 503-506, 508-515, and 517 may be performed by the cloud computing system 210.

In the example of FIG. 10, the user, who is the recipient in the method of FIG. 10, receives a notification e-mail indicating that the sender has sent him a file (step 501). The user clicks on a link on the e-mail, thereby opening the web browser 206 to the SFT portal of the cloud computing system 210, which in this example is provided by the post office server 212 (step 502). If the user is not a registered user of the post office server 212, the user is allowed to register through a new user registration process (step 503 to step 505). Otherwise, the user signs in to the post office server 212 (step 503 to step 504). The post office server 212 serves a webpage with a download link to allow the user to download the file (step 506). The user clicks on the download link (step 507). In response, the post office server 212 requests and receives the private key of the user from the key server 213 (step 508).

For each encrypted file, the post office server 212 retrieves the corresponding e-mail addresses of the recipients (step 509) and encrypted message keys (step 510). When an encrypted file has multiple recipients, and thus multiple encrypted message keys, the post office server 212 tries to find the matching encrypted message key, i.e., the message key that has been encrypted using the user's public key (step 511). For example, the post office server 212 may employ the private key of the user (retrieved in step 508) to try to decrypt each of the encrypted message keys until an encrypted message key is successfully decrypted. When the user is the only recipient of an encrypted file, the post office server 212 simply decrypts the encrypted message key using the private key of the user.

After decrypting the user's encrypted message key (step 512), the post office server 212 uses the now decrypted message key to decrypt the encrypted file on the cloud computing system 210 (step 513). The now decrypted file is transferred from the cloud computing system 210 to the receiving computer 202 of the user (step 514). After the file download or after file decryption, the post office server 212 sends a read receipt to the sender if the sender so requested (step 515). The user saves the file locally and opens the file (step 516). The post office server 212 deletes the decrypted file from the cloud computing system 210 (step 517).

FIGS. 11-14 schematically show user interfaces for receiving a file by person-to-person secure file transfer in accordance with an embodiment of the present invention. The user interfaces may be displayed on the display monitor of the receiving computer 202.

Figure 11:
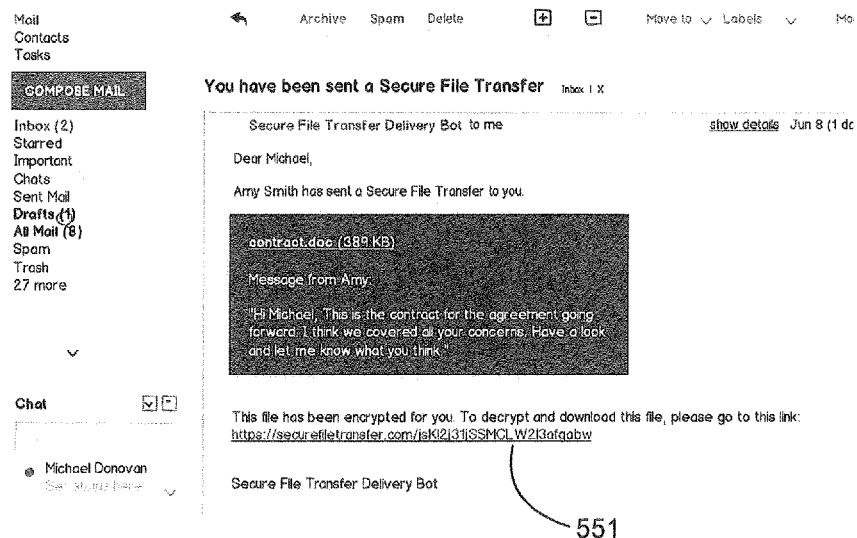
FIGS. 11-14 schematically show user interfaces for receiving a file by person-to-person secure file transfer in accordance with an embodiment of the present invention.

In FIG. 11, the user, who is the recipient in this example, receives an e-mail notification of availability of an encrypted file sent to the user. The user clicks on a link 551 included in the e-mail notification. User interfaces for authenticating the user, e.g., logging into the cloud computing system 210 (e.g., FIG. 10, steps 503-505), may be displayed before or after receiving the notification and are not shown in the interest of clarity.

Figure 12:
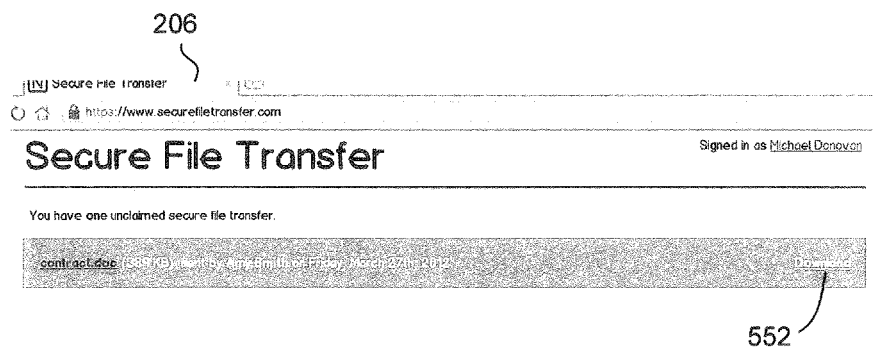

In FIG. 12, in response to activation of the link 551, the web browser 206 opens to display a webpage of the post office server 212 showing a download link 552 for the encrypted file, which in this example is the "contract.doc" file sent in the example of FIGS. 5-9. In the background, the post office server 212 performs decryption of the encrypted file on the cloud computing system 210 in a manner previously discussed. Advantageously, the file decryption is performed without the user having to manage encryption keys. As can be appreciated, the person-to-person secure file transfer process is simple enough so that a user who is not necessarily computer savvy can take advantage of the process to securely receive files.

Figure 13:
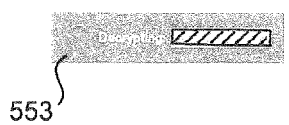

In FIG. 13, in response to the user clicking on the download link 552, the post office server 212 initiates the download of the decrypted file. A webpage served by the post office server 212 displays a progress bar 553 showing the status of the file decryption and download.

Figure 14:
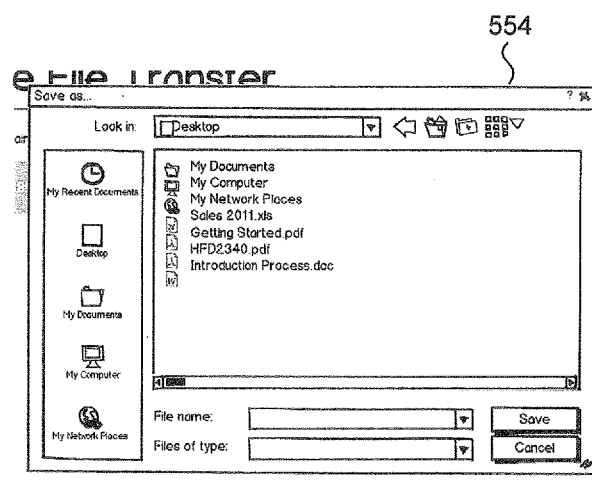

In FIG. 14, when the file download is complete, the web browser 206 displays a user interface 554 to allow the user to locally save the decrypted file in the receiving computer 202.

In some embodiments, the receiving computer 202 may itself be running an SFT application to receive files. In that case, the person-to-person secure file transfer process is even easier to perform because the SFT application is registered with the post office server 212 and may be specifically configured and optimized to receive files as now described beginning with FIG. 15.

Figure 15:
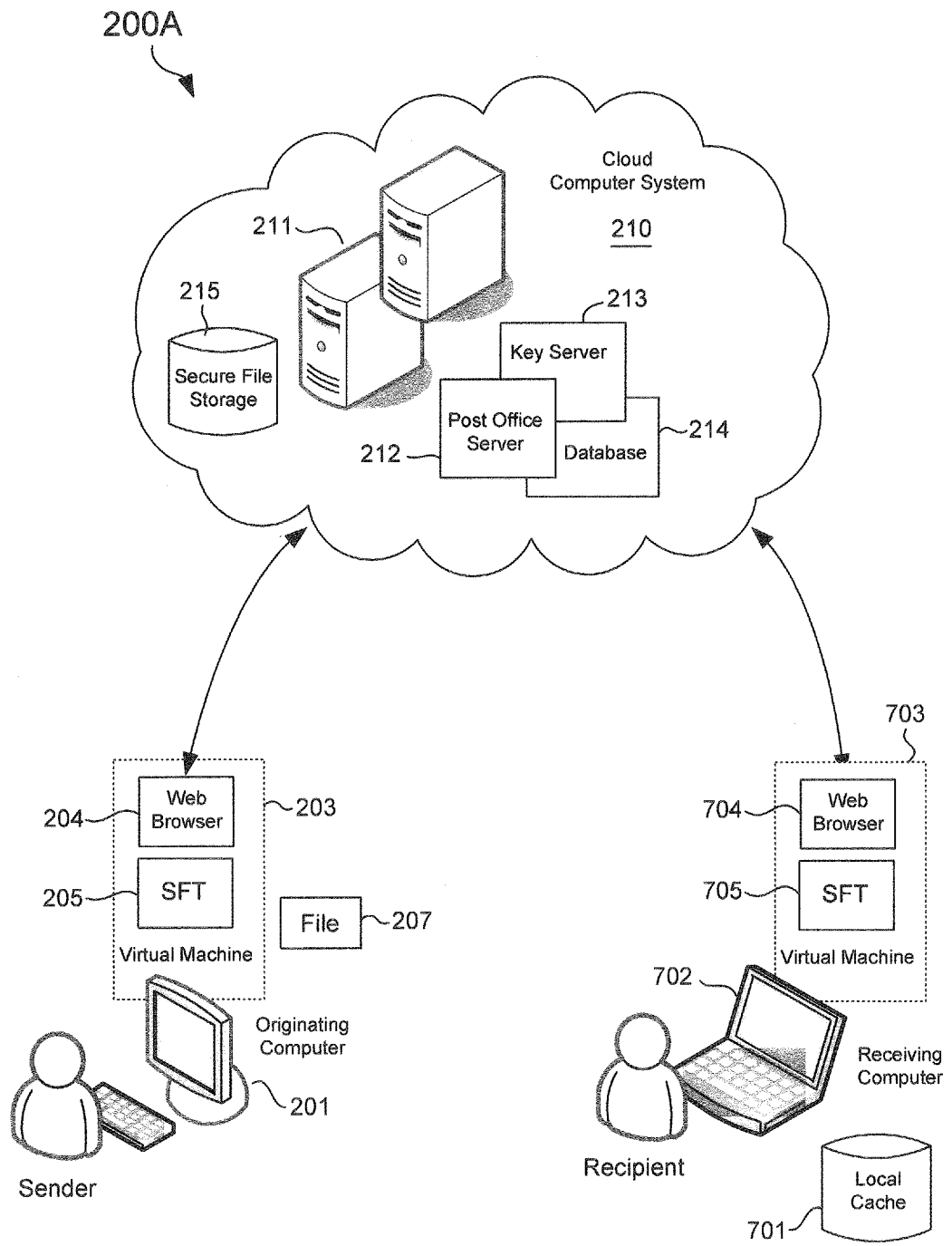
FIG. 15 shows a schematic diagram of a person-to-person secure file transfer system in accordance with another embodiment of the present invention.

FIG. 15 shows a schematic diagram of a person-to-person secure file transfer system 200A in accordance with another embodiment of the present invention. The system 200A is the same as the system 200 of FIG. 2, except for the use of a web browser 704 and an SFT application 705 in a receiving computer 702 employed by the recipient. Like its counterpart in the originating computer 201, the SFT application 705 may be invoked from a web browser 704, be a stand-alone application, or be part of a computer security application suite, to name some example implementations. In the example of FIG. 15, the SFT application 705 runs in a virtual machine 703 for improved security. The receiving computer 702 may further include a local cache 701 for caching private keys received from the key server 213. The other components of the system 200A have been previously described with reference to FIG. 2.

In one embodiment, the receiving computer 702 receives a notification of availability of one or more encrypted files from the cloud computer system 210, downloads the encrypted files and corresponding encrypted message keys from the cloud computer system 210, receives and caches private keys from the key server 213, decrypts the message keys using the recipient's private key, and decrypts the encrypted files using decrypted message keys. In contrast to the receiving computer 202 of FIG. 2, the receiving computer 702 may locally perform decryption of encrypted files in the receiving computer 702.

In one embodiment, the SFT application 705 has all the functionalities of the SFT application 205 for sending files. In addition, the SFT application 705 allows for downloading of encrypted files from the cloud computing system 210 and performs decryption of encrypted files in the receiving computer 702. The post office server 212 may be configured to simply provide encrypted files and corresponding encrypted message keys to receiving computers that have an SFT application, and perform decryption of encrypted files for receiving computers that do not have an SFT application.

The SFT application 705 may receive a notification from the post office server 212 of an encrypted file for the recipient, receive the encrypted file and corresponding encrypted message key from the secure file storage 215, request the private key of the recipient from the key server 213 or retrieve the private key from the local cache 701, decrypt the encrypted message key using the private key of the recipient, and decrypt the encrypted file using the decrypted message key.

An encrypted file may be received from the cloud computing system 210 and stored in encrypted form at rest in the receiving computer 702. The encrypted file may then be decrypted later on when the user clicks on the encrypted file. For example, in response to the user clicking on the encrypted file, a file association may invoke the SFT application 705, which then proceeds to retrieve the corresponding private key and encrypted message key of the file, decrypt the encrypted message key using the private key, and decrypt the encrypted file using the decrypted message key.

Figure 16:
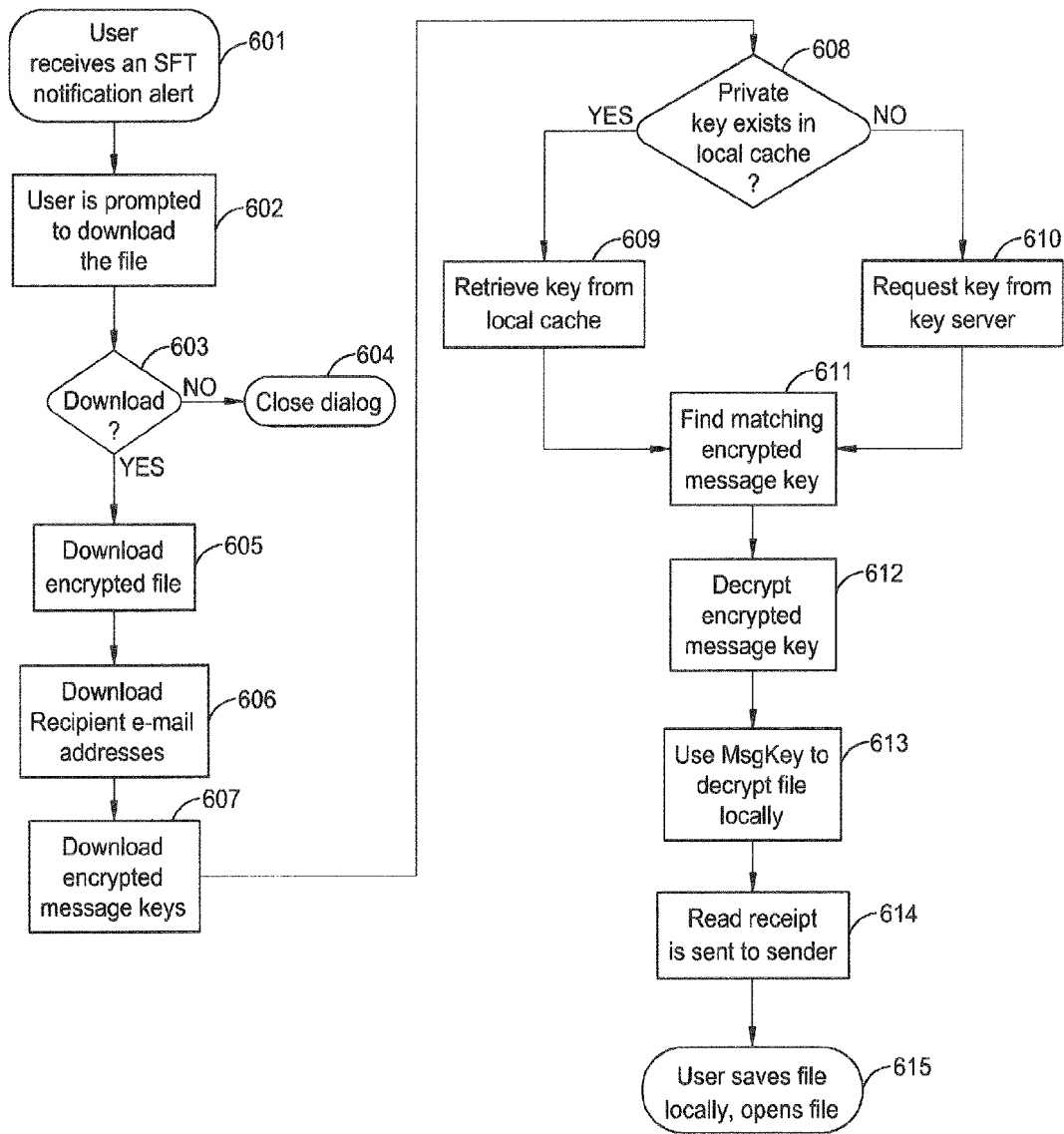
FIG. 16 shows a flow diagram of a method of receiving a file by person-to-person secure file transfer in accordance with another embodiment of the present invention.

FIG. 16 shows a flow diagram of a method of receiving a file by person-to-person secure file transfer in accordance with another embodiment of the present invention. The steps of the method of FIG. 16 may be performed by the receiving computer 702 of the system 200A (see FIG. 15).

The user, who is the recipient in the method of FIG. 16, receives a notification indicating that the sender has sent him an encrypted file (step 601). In one embodiment, the notification is received by the SFT application 705 from the SFT application 205 of an originating computer 201 or the post office server 212. The SFT application 705 displays a user interface that prompts the user to download the encrypted file (step 602). The method ends when the user does not want to download the encrypted file (step 603 to step 604). Otherwise, when the user wants to download the encrypted file, the SFT application 705 proceeds to download the encrypted file from the cloud computing system 210 to the receiving computer 702 (step 603 to step 605). The SFT application 705 also downloads the corresponding recipient e-mail addresses (step 606) and encrypted message keys (step 607) for the encrypted file.

It is to be noted that the step 606 of downloading recipient e-mail addresses to the receiving computer 702 may be omitted in embodiments where the recipient e-mail addresses are not packaged with the encrypted file. In embodiments where the recipient e-mail addresses and message keys are packaged with the encrypted file, e.g., as flag strings, the package as a whole may be downloaded in the receiving computer 702, and parsed to retrieve the encrypted file and encrypted message keys. The encrypted message key may also be stored in a header of the encrypted file for portability.

The SFT application 705 checks the local cache 701 for the private key of the user for decrypting the encrypted file (step 608). When the private key is in the local cache 701, the SFT application 705 simply retrieves the private key from the local cache 701 (step 608 to step 609). Otherwise, when the private key of the user for decrypting the encrypted file is not available in the local cache 701, the SFT application 705 requests and receives the private key from the key server 213 (step 608 to step 610). The private key is then cached in the local cache 701.

When the encrypted file has multiple recipients, and thus multiple encrypted message keys, the SFT application 705 tries to find the matching encrypted message key, i.e., the message key that has been encrypted using the user's public key (step 611). For example, the SFT application 705 may employ the private key of the user to try to decrypt each of the downloaded encrypted message keys until an encrypted message key is successfully decrypted. When the user is the only recipient of the encrypted file, the SFT application 705 simply decrypts the encrypted message key using the private key of the user.

After decrypting the encrypted message (step 612), the SFT application 705 uses the now decrypted message key to decrypt the encrypted file locally in the receiving computer 702 (step 613). After decrypting the encrypted file, the SFT application 705 sends a read receipt to the sender if the sender so requested (step 614). The user saves the file locally and opens the file (step 615).

FIGS. 17-20 schematically show user interfaces for receiving a file by person-to-person secure file transfer in accordance with another embodiment of the present invention. The user interfaces may be displayed on the display monitor of the receiving computer 702.

Figure 17:
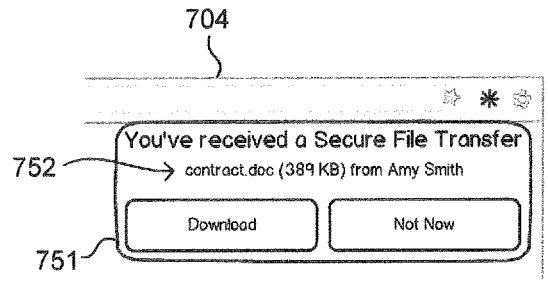
FIGS. 17-20 schematically show user interfaces for receiving a file by person-to-person secure file transfer in accordance with another embodiment of the present invention.

In FIG. 17, the user, who is the recipient in this example, receives a notification of availability of an encrypted file sent to the user. The notification is received by the SFT application 705. In response to receiving the notification, the SFT application 705 displays a user interface 751 that gives the user the option to download the encrypted file, which in this example is the "contract.doc" file (see arrow 752) sent in the example of FIGS. 5-9. The user interface 751 is displayed over the window of the web browser 704. The user clicks on the "Download" button to download the encrypted file to the receiving computer 702.

Figure 18:
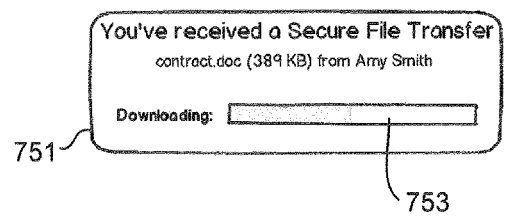

In FIG. 18, in response to activation of the download button of the user interface 751, the SFT application 705 initiates download of the encrypted file and updates the user interface 751 to display a download progress bar 753 that shows the status of the download process.

Figure 19:
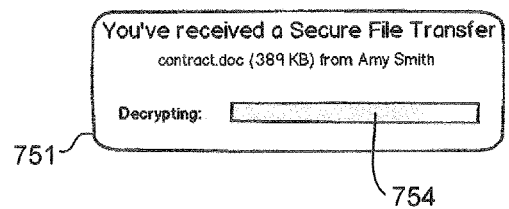

In FIG. 19, after receiving the encrypted file in the receiving computer 702, the SFT application 705 automatically initiates decryption of the encrypted file in the receiving computer 702 in a manner previously discussed. Advantageously, the file decryption is performed automatically and without the user having to manage encryption keys. The SFT application 705 updates the user interface 751 to display a decryption progress bar 754 that shows the status of the decryption process.

Figure 20:
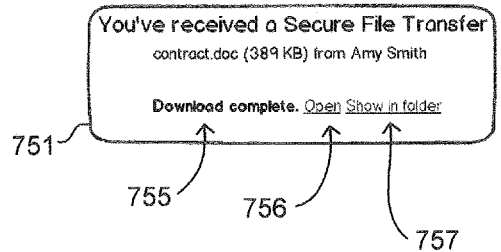

In FIG. 20, after the encrypted file has been decrypted to recover the file sent by the sender, the SFT application 705 updates the user interface 751 to indicate that the download and decryption have been completed (see arrow 755), and that the now decrypted file may be opened (see arrow 756) or shown in its file folder (see arrow 757) by clicking the corresponding link.

While specific embodiments of the present invention have been provided, it is to be understood that these embodiments are for illustration purposes and not limiting. Many additional embodiments will be apparent to persons of ordinary skill in the art reading this disclosure.

What is claimed is:

1. A method of person-to-person secure file transfer, the method comprising:
    encrypting a file in an originating computer using a message key to generate an encrypted file for a recipient;
    in the originating computer, receiving a public key of the recipient from a cloud computing system that stores the public key and a corresponding private key of the recipient;
    encrypting the message key using the public key of the recipient to generate an encrypted message key in the originating computer;
    transferring the encrypted file from the originating computer to the cloud computing system for storage in the cloud computing system;
    in response to receiving a request from a receiving computer of the recipient, decrypting the encrypted message key using the private key of the recipient to recover the message key in the cloud computing system;
    decrypting the encrypted file using the message key to recover the file in the cloud computing system; and
    after decrypting the encrypted file, transferring the file from the cloud computing system to the receiving computer.

2. The method of claim 1 wherein the request from the receiving computer is from a web browser.

3. The method of claim 1 wherein the encryption of the message key using the public key of the recipient to generate the encrypted message key is performed using a file transfer application running in a virtual machine hosted by the originating computer.

4. The method of claim 1 wherein the message key is randomly generated in the originating computer.

5. The method of claim 1 further comprising:
    sending a notification about the encrypted file from the originating computer to the receiving computer of the recipient.

6. The method of claim 5 wherein the notification is an e-mail notification.

7. The method of claim 1 further comprising:
    sending a notification about the encrypted file from the cloud computing system to the receiving computer of the recipient.

8. A system for person-to-person secure file transfer, the system comprising:
    an originating computer that encrypts a file using a message key to generate an encrypted file, receives a first key of a recipient of the encrypted file from a cloud computing system, encrypts the message key using the first key of the recipient to generate an encrypted message key, and sends the encrypted file to the cloud computing system; and
    the cloud computing system that generates the first key and a second key of the recipient, provides the first key of the recipient to the originating computer, receives the encrypted file from the originating computer, receives a request for the encrypted file from a receiving computer of the recipient, decrypts the encrypted message key using the second key of the recipient to recover the message key, decrypts the encrypted file using the message key to recover the file, and provides the file to the receiving computer after decrypting the encrypted file.

9. The system of claim 8 further comprising:
    the receiving computer that receives a notification about the encrypted file, and receives the file from the cloud computing system after the cloud computing system has decrypted the encrypted file.

10. The system of claim 9 wherein the receiving computer receives the notification from the cloud computing system.

11. The system of claim 9 wherein the notification comprises an e-mail notification.

12. The system of claim 11 wherein the receiving computer receives the e-mail notification about the encrypted file from the originating computer.

13. The system of claim 8 wherein the originating computer randomly generates the message key.

14. The system of claim 8 wherein the first key of the recipient comprises a public key of the recipient and the second key of the recipient comprises a private key of the recipient.

15. A system for person-to-person secure file transfer, the system comprising:
    a cloud computing system that generates a first key and a second key of a recipient of an encrypted file, provides the first key of the recipient to an originating computer that encrypts a file using a message key to generate the encrypted file and encrypts the message key using the first key of the recipient to generate an encrypted message key, receives the encrypted file from the originating computer, receives a request for the encrypted file from a receiving computer of the recipient, and provides the encrypted file and the second key of the recipient to the receiving computer; and
    the receiving computer that receives a notification about the encrypted file, receives the encrypted file from the cloud computing system, receives the second key of the recipient from the cloud computing system, decrypts the encrypted message key using the second key of the recipient to recover the message key, and decrypts the encrypted file using the message key to recover the file.

16. The system of claim 15 further comprising:
the originating computer that encrypts the file using the message key to generate the encrypted file, receives the first key of the recipient from the cloud computing system, encrypts the message key using the first key of the recipient to generate the encrypted message key, and sends the encrypted file to the cloud computing system.

17. The system of claim 16 wherein the originating computer randomly generates the message key.

18. The system of claim 15 wherein the receiving computer receives a notification about the encrypted file from the cloud computing system.

19. A method of person-to-person secure file transfer, the method comprising:
encrypting a file in an originating computer using a message key to generate an encrypted file for a recipient;
in the originating computer, receiving a public key of the recipient from a cloud computing system that stores the public key and a corresponding private key of the recipient;
encrypting the message key using the public key of the recipient to generate an encrypted message key in the originating computer;
transferring the encrypted file from the originating computer to the cloud computing system for storage in the cloud computing system;
in response to receiving a request from a receiving computer of the recipient, transferring the encrypted file from the cloud computing system to the receiving computer;
transferring the private key of the recipient from the cloud computing system to the receiving computer;
decrypting the encrypted message key using the private key of the recipient to recover the message key in the receiving computer; and
decrypting the encrypted file using the message key to recover the file in the receiving computer.

20. The method of claim 19 wherein the request from the receiving computer is from a web browser.

21. The method of claim 19 wherein the encryption of the message key using the public key of the recipient to generate the encrypted message key is performed using a file transfer application running in a virtual machine hosted by the originating computer.

22. The method of claim 19 wherein the message key is randomly generated in the originating computer.

23. The method of claim 19 further comprising:
sending a notification about the encrypted file from the originating computer to the receiving computer of the recipient.

24. The method of claim 23 wherein the notification is an e-mail notification.

25. The method of claim 19 further comprising:
sending a notification about the encrypted file from the cloud computing system to the receiving computer of the recipient.

* * * * *